(12) United States Patent
Shinozuka

(10) Patent No.: US 8,172,575 B2
(45) Date of Patent: May 8, 2012

(54) MAP IN AZIMUTHAL EQUIDISTANT HEMISPHERIC PROJECTION WITH REDUCED DISTORTION

(76) Inventor: Yasuo Shinozuka, Foster City, CA (US)

( * ) Notice: Subject to any disclaimer, the term of this patent is extended or adjusted under 35 U.S.C. 154(b) by 469 days.

(21) Appl. No.: 12/321,795

(22) Filed: Jan. 26, 2009

(65) Prior Publication Data
US 2009/0197223 A1    Aug. 6, 2009

Related U.S. Application Data

(60) Provisional application No. 61/063,972, filed on Feb. 6, 2008.

(51) Int. Cl.
*G09B 27/08* (2006.01)
(52) U.S. Cl. .......................... 434/135; 434/141
(58) Field of Classification Search .................. 434/130, 434/131, 135, 137, 141, 149, 150, 153; 33/431, 33/457
See application file for complete search history.

(56) References Cited

U.S. PATENT DOCUMENTS

| | | | | |
|---|---|---|---|---|
| 1,110,217 A * | 9/1914 | Maull | | 33/457 |
| 1,170,537 A * | 2/1916 | Holmes | | 33/431 |
| 1,458,762 A * | 6/1923 | Hartman | | 434/135 |
| 2,352,380 A * | 6/1944 | Gingery | | 434/135 |
| 3,997,980 A * | 12/1976 | Rogers | | 434/141 |
| 5,222,896 A * | 6/1993 | Smith, Jr. | | 434/135 |
| 5,657,552 A * | 8/1997 | Reineck et al. | | 33/784 |
| 5,695,342 A * | 12/1997 | Schaper et al. | | 434/135 |
| 5,902,113 A * | 5/1999 | Pryor et al. | | 434/153 |
| 7,331,790 B1 * | 2/2008 | Shinozuka | | 434/135 |

* cited by examiner

*Primary Examiner* — Kurt Fernstrom

(57) ABSTRACT

According to one embodiment, world maps in the Azimuthal Equidistant (AE) Hemispheric projection are formed by depicting the main hemisphere of a globe in full and the opposing hemisphere in the form of two semi-hemispheres contiguous two spaced side portions of the main hemisphere. Any city (or location) of interest in the world can be highlighted as the center point of the main hemisphere. Each of these two semi-hemispheres is movable along the circumference of the main hemisphere so that a straight line can be drawn from the center point of the main hemisphere to any other point on the two semi-hemispheres via corresponding tangent points. This straight line is a part of a great circle and will show correct distance and direction from the center point to the other point. A transparent ruler, a set of gears, a compass rose and others may be attached to this map for quicker and easier acquisition of correct distance and direction. Differing from the regular AE projection, this AE Hemispheric projection has less distortion and more realistic shapes of the continents, even at remote areas, and also shows the antipodal point explicitly as a point.

7 Claims, 6 Drawing Sheets

MAP IN AZIMUTHAL EQUIDISTANT HEMISPHERIC PROJECTION WITH REDUCED DISTORTION

CROSS-REFERENCE TO RELATED CASES

The embodiments in this application are related to, supplement, and improve upon those of my previous application, Ser. No. 11/033,420, filed Jan. 10, 2005, now U.S. Pat. No. 7,331,790, issued Feb. 19, 2008.

Also, this application claims the benefit of PPA Ser. No. 61/063,972, filed Feb. 6, 2008 by the present inventor.

BACKGROUND

1. Field

The present application relates to map projections of the world or any land or other area. Specifically, it relates to improved maps in the Azimuthal Equidistant projection format.

2. Prior Art

Although there are hundreds of available map projections, the majority of world maps in atlases and books are still drawn by the Mercator projection or its variations. In such maps, the equator is placed in the center and the North Pole at the top. As a result of being raised with such equator-centered maps, we have a tendency to think horizontally or along latitude lines. Thus,

- We may think Hawaii is directly between the U.S. and Japan.
- If we go to India, China, or any other Asian country by an eastbound flight from the East Coast of the U.S., we assume that we would fly over the Mediterranean Sea and the Middle Eastern countries.
- But if we depart from the West-Coast cities to those destinations by a westbound flight, we assume that we would fly westward, crossing the Pacific Ocean.
- We assume that the distance between Seattle and Moscow is greater than that between Miami and Moscow.
- We assume that if we went due west from San Francisco we would cross over Japan and likewise if we went due east we would pass over somewhere near Washington D.C. In other words, we assume that east-west line of cardinal direction is parallel to latitude line.

However, all of the above assumptions are wrong: the Aleutian Islands, not Hawaii, are between the U.S. and Japan. From most cities of the U.S. to India or China, we would cross the Arctic Ocean, not the Pacific or the Atlantic Ocean. The distance between Miami and Moscow is slightly longer than between Seattle and Moscow; this is because the shortest air route of the latter is again over the Arctic Ocean, not over the North American Continent. I will discuss the East-West paths in conjunction with FIG. 5 in the detailed description section.

David Greenhood, in "Down to Earth: Mapping for Everybody" (Holiday House, 1944, repub. by U. of Chicago Press 1964 as "Mapping") notes similar misconceptions. Greenhood even suggests we discard all scientific world maps. However, more than 60 years later, misleading world maps still prevail.

World maps in Western civilization were developed mainly for mariners, who were not very concerned about shortening a day out of a month-long windjammer cruise by selecting the shortest possible course. Quite a time has elapsed since then and the age of air has mostly supplanted ocean travel. But peoples' mindsets remain the same: they cannot shed their adherence to the traditional equator-centered maps.

Nowadays in the dawning of the space age, a virtual Earth presented on a computer is popular. Composed from satellite pictures, its appearance is very realistic. By manipulating a mouse, it gives us a feeling of flying over the real Earth. We can draw arc lines to show air routes between many cities in the world. But functionally, it is nothing but a flat projection of a 3-D globe. Even the globe itself has problems: Although a globe is the only possible distortion-free representation of the Earth, we cannot see all parts of the whole world in one view. To view relationships between remote countries, we have to turn it around, back and forth. Even when viewing any area of the Earth, figures in the central portion look expanded and the ones in the outer or surrounding areas are shrunk or invisible.

Therefore, we need world maps more suited for the age of aviation. Among the existing world map projections, I believe the Azimuthal Equidistant (AE) projection is optimal. Azimuthal projections preserve azimuths (angles or directions) and roundness in general. Also the azimuthal equidistant projection has linearly-increasing distances from a central point of a map. In this projection a straight line from a central point to any other point gives the shortest distance between the two points. Using it, we can show the correct distance and direction from a center point on the map to any place in the world. Because of these features, this projection has been used for airline routes, seismic propagation, radio communication, and others. However, presently available maps drawn by this projection have a serious defect. The shapes of continents at the periphery are stretched like a figure in a mirror of a fun house. Since the shapes are too different from real figures on a globe to be recognized, this map is too grotesque for daily use.

Incidentally, although we can move a virtual Earth on a computer anyway we want, similar to the manipulation of a globe, I have not seen a flat world map that is movable and generally usable like a virtual Earth. Because of distortion problems that are contained in most map projections, a moving flat map is unpractical. If a center point of such a virtual flat map in the Mercator projection were moved gradually to the north or south, one would see the continents change their shapes and sizes. I.e., they would be dilated then shrunk constantly on computer. I will discuss this matter later in relation to a satellite path and the rotation of the Earth.

In the AE projection, an antipodal point (a point directly or exactly opposite a given point on Earth) is not shown as a point, but is transformed and stretched. It is actually shown as a line of the full circumference of a map. Thus the antipodal point is not apparent, not only in this projection but also in almost all projections. It may be not so important to know its location, but if we can show the antipodal point of our hometown clearly in maps, it will pique peoples' interests, especially among young students, toward geography.

In order to overcome these problems, my above-referenced patent provides a good solution. Since the purpose of the embodiments shown in this patent was to provide a unified shape of all continents in less distortion, the center point of the continental hemisphere could not be moved away from a certain point in France. In the resulting map, some countries, such as Japan, are located at the farthest border of a circle. This map may be less appealing as a reference world map to people who live in such countries at the periphery. Besides, it lacks an important aspect of the AE projection: Except for France and its neighboring countries, the shortest air routes between other countries are not shown by straight and measurable lines, but are only suggested by graticule lines of latitude and longitude.

In conclusion, there are many prior-art maps in geography and cartography but they are not satisfactory because 1. The majority of popular world maps has the equator at its center and has misled peoples' conceptions about the shortest air routes between most of the landmasses (I use this word for "continents and major islands" in this application).
2. An AE projection map shows the correct distance and direction between a given center point of the map and any other point on Earth, but deformation of shapes of landmasses increases and becomes unrecognizable toward the edges rim.
3. The AE projection and others do not show the antipodal point clearly.

ADVANTAGES

Accordingly, several advantages of one or more of the present embodiments are:
1. A world map can show the shortest air routes and correct directions between a center point and any other point on Earth without much distortion of shapes of landmasses.
2. A world map can show any antipodal point as a point.
3. A flat world map can convey the Earth's roundness.
4. An improved map is provided in the AE format.

Other advantages of one or more embodiments are:
5. A flat world map is provided in which any location can be used as the center of interest.
6. In such a map the distance and direction from any point to any other point can be measured more accurately.
7. A map can be provided that is relevant to persons at every location on the map's territory.

Still further advantages of various embodiments will become apparent from a consideration of the ensuing description and drawings.

DRAWINGS

SUMMARY

Figure 1:
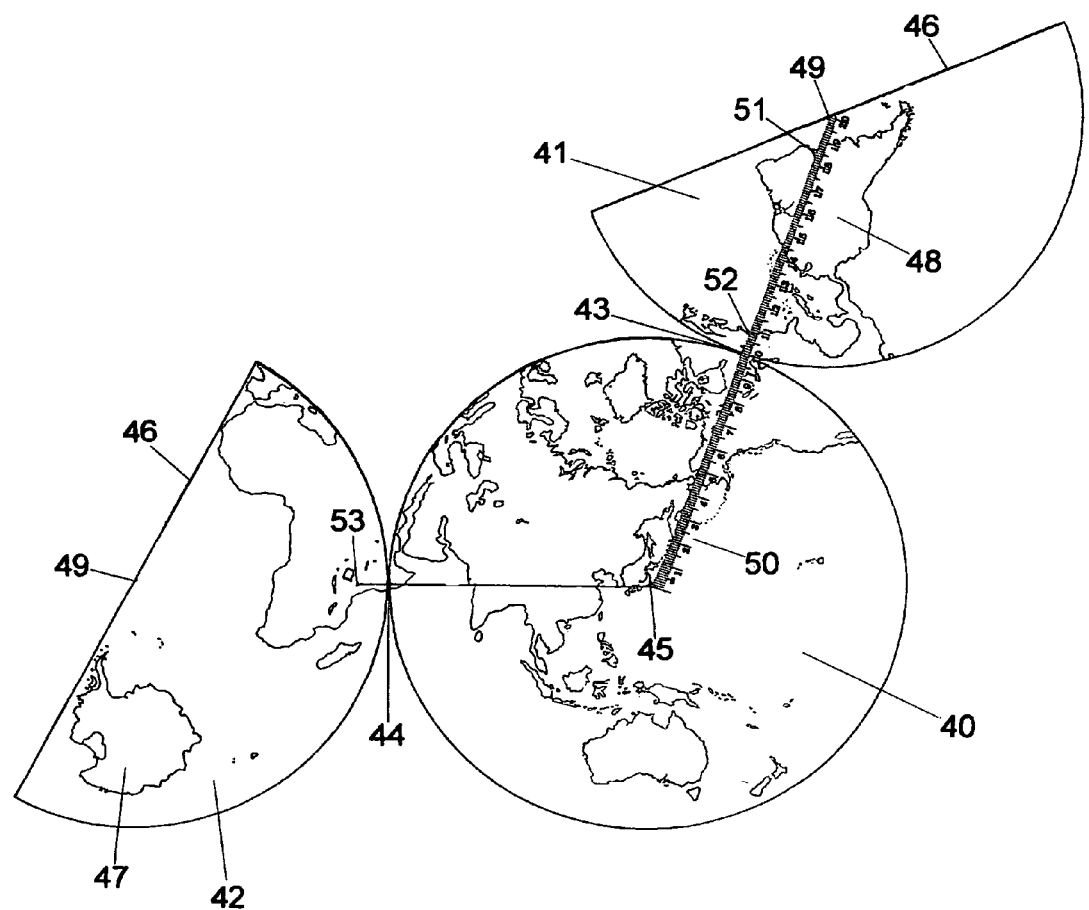
FIG. 1 is first embodiment showing a world map centered on Tokyo in an Azimuthal Equidistant Hemispheric projection with an overlaid transparent ruler.

According to one embodiment, a map is made by drawing a hemisphere map as a main body using an AE projection and by attaching two halves of the opposing hemisphere on the same projection. The two halves of the opposing hemisphere are movable along the circumference of the main body so that any point in the opposing hemisphere is connected to the center point of the main body by a straight line. The line is easily indicated by a ruler attached to the center point of the main body. In order to match the topography of the two hemispheres, gears may be attached to backs of the hemispheres.

DETAILED DESCRIPTION

First Embodiment

FIG. 1

World Map in AE Hemispheric Projection

As mentioned, I believe that the AE projection is the best map in this age of aviation and satellite. However, an ordinary world map in this projection is usually drawn in one big circle, of which an inner small circle with half diameter represents a front and main hemisphere of a globe. The opposing hemisphere of the same globe does not remain round but is added to outside of the inner circle as a large ring. This transformation invites the same huge distortion problem as seen in Polar Regions in the Mercator projection. To overcome the grotesque shape problems at the periphery of this projection, I have provided the arrangement of FIG. 1, which shows a hemisphere 40 as a main body in the center. The opposing hemisphere is shown in two parts to hemisphere 40. One half 41 of the opposing hemisphere is placed contiguous the main body, so that the interrupted landmasses of the main body are connected and completed at a tangent point 43. The other half 42 of the opposing hemisphere is also attached to the main body at another tangent point 44. I call these halves semi-hemispheres 41 and 42.

I believe that this map is superior to the AE projection in that the distortion problem of the opposing hemisphere disappears and all the shapes of landmasses are recognizable.

Center point 45 of the main body is shown for exemplary purposes in FIG. 1 as Tokyo, Japan. So I call hemisphere 40 a "Tokyo hemisphere" and the opposing hemisphere (shown in two halves) an "anti-Tokyo hemisphere". However any other city, such as San Francisco, New York, Melbourne, or any spot on Earth, such as an epicenter of an earthquake or tsunami, can replace Tokyo. The two-part anti-Tokyo hemisphere may be divided anywhere, but I prefer to divide it in an ocean along a line 46 between Antarctica 47 and South America 48. By chance, this line is the only place that does not cut any major landmasses in this anti-Tokyo hemisphere. Note that antipodal point 49 of Tokyo is in the middle of the divided line of the anti-Tokyo hemisphere.

I have tacked a transparent ruler 50 to the center point of the Tokyo hemisphere. The ruler can pivot around like a hand of a clock. The ruler is divided into 20 main units of 10 subunits each, where each unit is 1,000 km. Since the Earth's circumference is about 40,000 km long, the distance between the center point of a given hemisphere and the antipodal point is 20 units. Thus, we can easily ascertain that the distance between Tokyo 45 and Sao Paulo 51 is about 18,500 km. New York City 52 happens to be located right on the straight line between Tokyo and São Paulo. So we can also easily ascertain at the same time that the distance between Tokyo and New York is about 11,000 km.

We may tack the other end of the ruler onto the antipodal point. By fixing the ruler this way, we can know how to align Tokyo 45 via tangent point 43, New York 52, and São Paulo 51 with antipodal point 49. The ruler makes a straight line which is a part of a great circle, which I will discuss later. If we fix the ruler to one of semi-hemispheres, we will need another ruler for the other semi-hemisphere.

I placed other semi-hemisphere 42 so that Tokyo and Nairobi 53 are aligned. The distance between them is measured a trifle greater than the one between Tokyo and New York.

Since the present map is an AE projection with the addition or use of a hemisphere and semi-hemispheres, I call this map an "Azimuthal Equidistant Hemispheric Projection".

FIG. 2

Gears

In order to enhance use of the map of FIG. 1, I provide a set of gears (FIG. 2) that can be adhered to the back of hemisphere 40 and semi-hemispheres 41 and 42. This figure shows that the disks of the hemispheres cover most parts of gears. The broken lines of the gear teeth indicate hidden and invisible parts by those hemispheric disks. With the aid of gears we can move the semi-hemispheres around easily and precisely along the circumference of the hemisphere.

The sizes and numbers of gear teeth do not matter on condition that the length of the circumference in the main hemisphere is the same as its counterpart semi-hemisphere. In this figure, the length is shown as tangent point A to another tangent point B in the main body, as well as A' to B' in semi-hemisphere 41.

Figure 2:
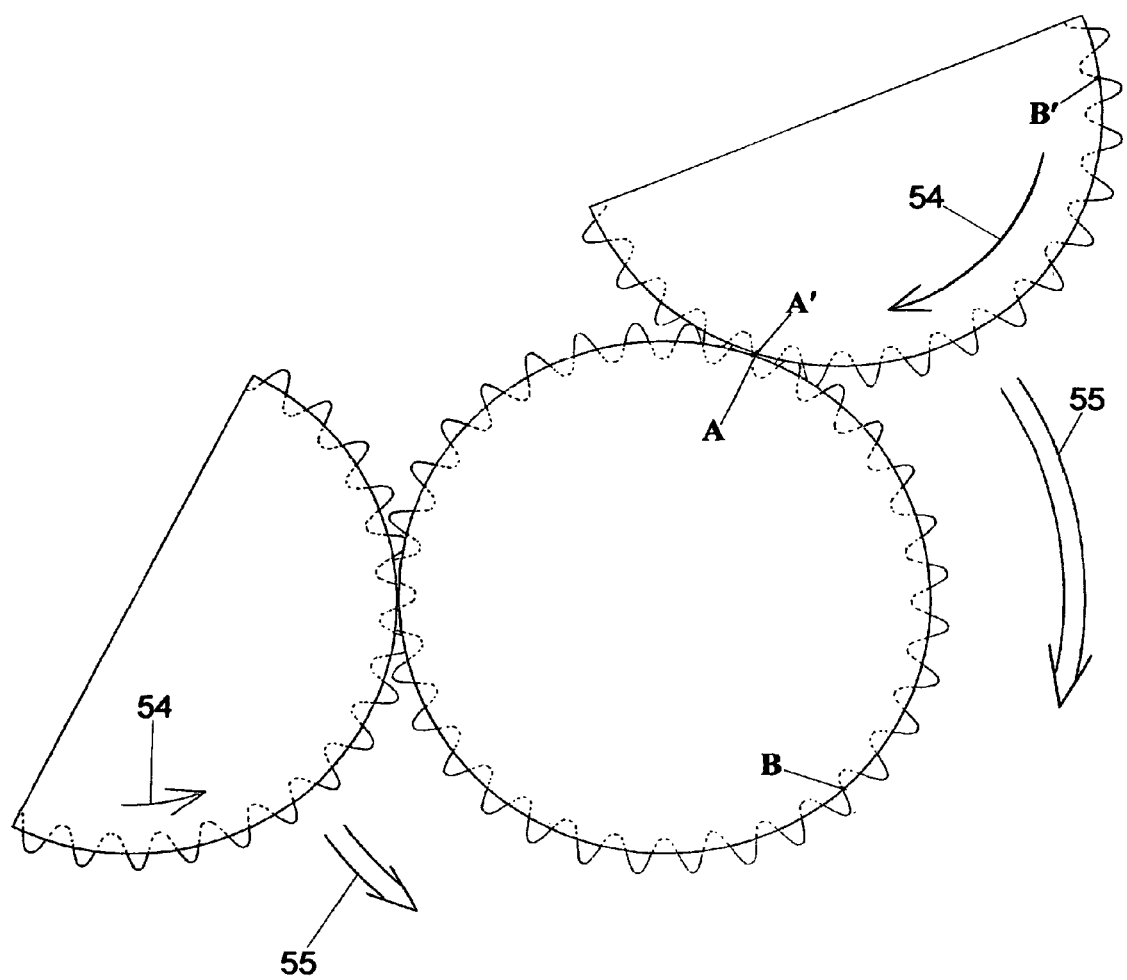
FIG. 2 is an illustration of a set of gears, which are designed to be attached to the back of the map of FIG. 1.
Figure 3:
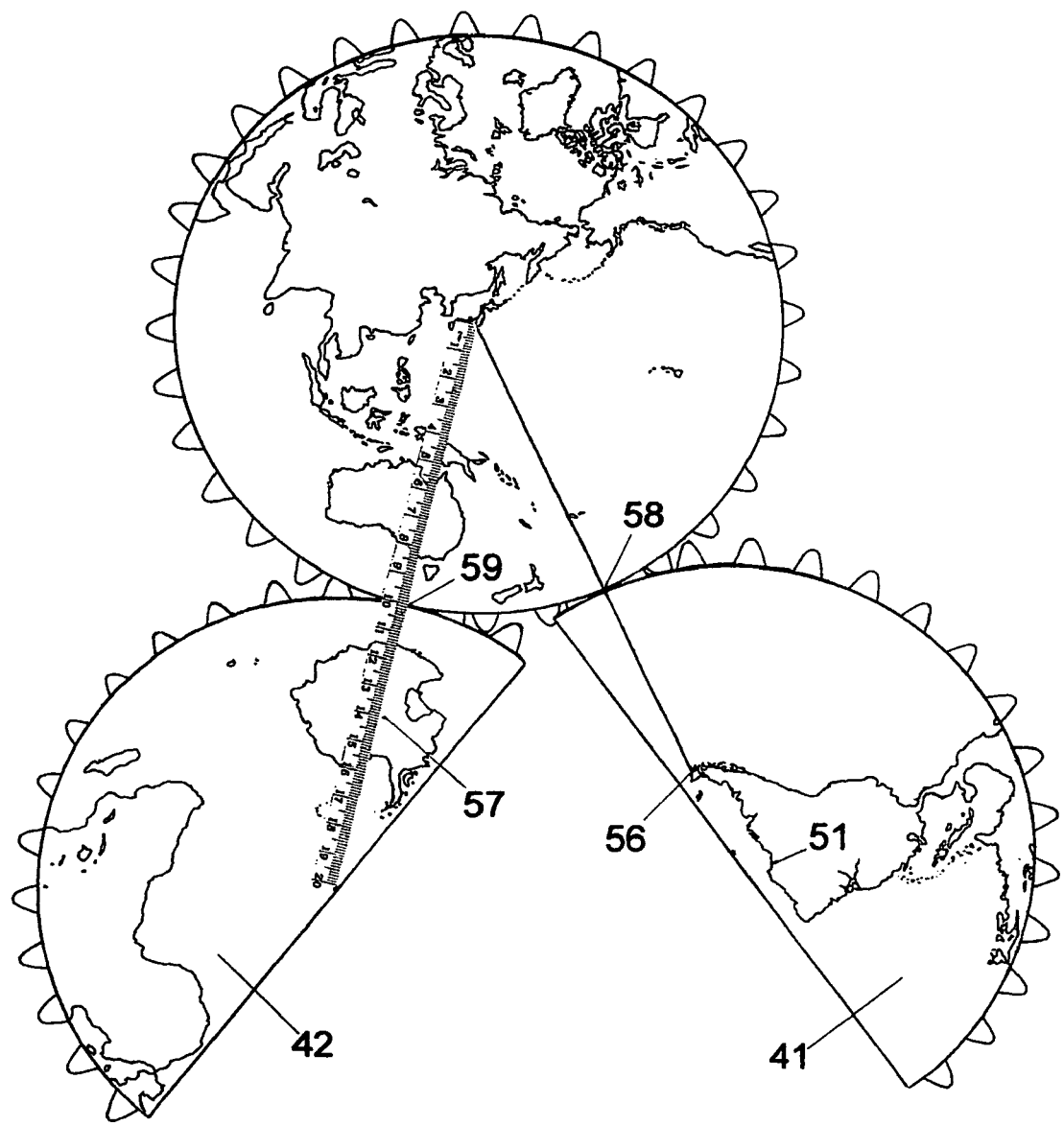
FIG. 3 is the world map with the gears attached. Note that two halves of the opposing hemisphere are in different positions from the ones in FIG. 1.

Single-lined arrows 54 show the direction of rotation of the semi-hemispheres, whereas double-lined arrows 55 show the direction of movement of their bodies when they translocate positions from FIG. 1 to FIG. 3.

FIG. 3

Hemisphere and Semi-Hemispheres with Gears Attached

To detail the above, FIG. 3 shows semi-hemispheres 41 and 42 contiguous different spots on hemisphere 40. Semi-hemisphere 41 is placed to indicate the straight-line direction from Tokyo to Cape Horn 56. Although Cape Horn is not far from São Paulo 51, their directions from Tokyo are totally different (compare FIG. 1).

Semi-hemisphere 42 is placed to measure the distance between Tokyo and South Pole 57, which is about 14,000 km. The distance between Tokyo and Cape Horn is about 17,000 km and greater than the distance between Tokyo and the South Pole, while the latter is further down under than Cape Horn.

A tangent point 58 between Tokyo and Cape Horn and another tangent point 59 between Tokyo and the South Pole are both among the ocean area. Gears make it easier to determine where the tangent points should be, even in areas where there are no interrupted landmasses.

FIG. 4

Hemisphere Maps with Latitude and Longitude Lines

Figure 4:
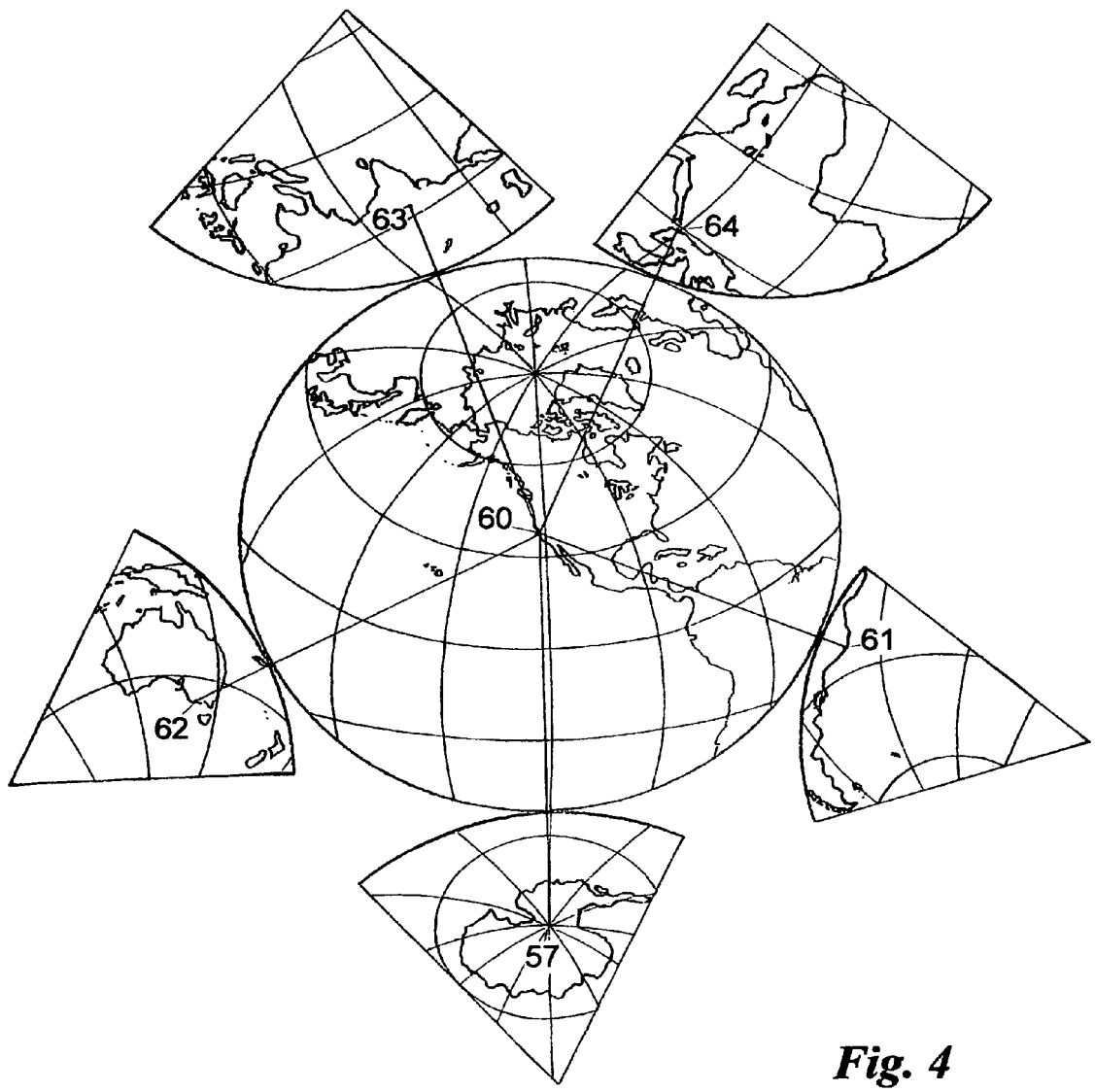
FIG. 4 is the world map centered on San Francisco with latitude and longitude lines. It also shows that the opposing hemisphere could be divided more than two pieces.

FIG. 4 shows a "San Francisco hemisphere" where San Francisco 60 is its center point. Latitude and longitude lines are drawn over this projection. The "anti-San Francisco hemisphere" is divided into five sections, instead of two semi-hemispheres, in order to show that the division of anti-hemispheres can be made at any numbers and at any places. It is useful when we want to compare distances visually between a center point and other points. In FIG. 4, the other points are Rio de Janeiro 61, the South Pole 57, Melbourne 62, New Deli 63, and Cairo 64.

This map shows the shortest air routes between San Francisco and New Deli or between San Francisco and Cairo, which may confute our expectation based on our familiarity with the equator-centered maps. We may also be surprised to know that the distance between San Francisco and New Deli is slightly less than the distance between San Francisco and Melbourne.

Incidentally, the divided pieces of the anti-hemisphere look like petals of a flower. So, if they are carefully divided and arranged like this figure, a world map of this kind may be used as an excellent design. I will call it "Earth-flower", after the sunflower.

FIG. 5

Great Circle Line in East-West Direction

Figure 5:
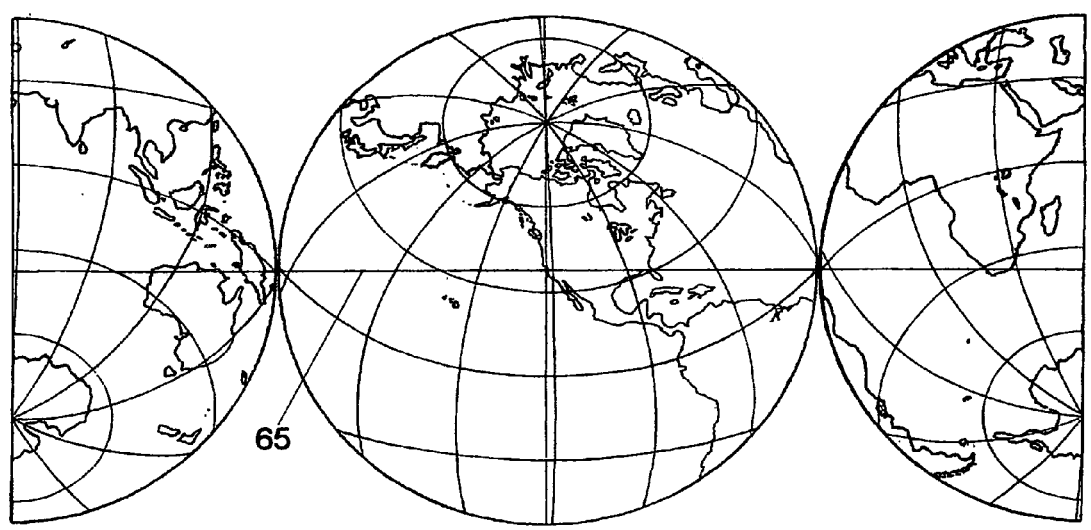
FIG. 5 is the same as FIG. 4 but aligned to east-west direction.

In FIG. 5 the "anti-San Francisco hemisphere" is divided into two parts sectioned at the meridian through the antipodal point. Each part is positioned adjacent the main hemisphere to show a great circle 65 aligning in east-west direction with San Francisco. Note that both semi-hemispheres are placed on exactly opposite sides of the main hemisphere. A great circle is a circle with the same diameter as the Earth and any given two points on a great circle constitute the shortest distance between them on the Earth's surface.

Proceeding to west from San Francisco, we may expect to reach Japan, but in realty we cross the equator near New Guinea and pass over the west coast of Australia. Conversely to east, we proceed to Miami, not Washington D.C. nor Virginia. Proceeding further, we cross the equator in the middle of the Atlantic near Brazil and reach the southern part of Africa.

Due east of a place on Earth is defined as a cardinal compass point that is at 90 degrees from due north, and due west of it is at 270 degrees. Since this east-west line, which crosses a north-south meridian line at right angles, is bent by curvature of a spherical surface of the Earth, it never runs parallel to latitude lines, contrary to impressions from Mercator projection and others. Due east is also defined as a direction to the position of the sun at 6:00 AM (ignoring daylight saving time) on the equinox day. Generally speaking, it is the time of sunrise. Since the sun is directly above the equator on Equinoxes, the direction of due east or west from any location (except on the equator itself), always crosses the equator, and is not parallel to it.

FIG. 6

Flat Globe

Figure 6:
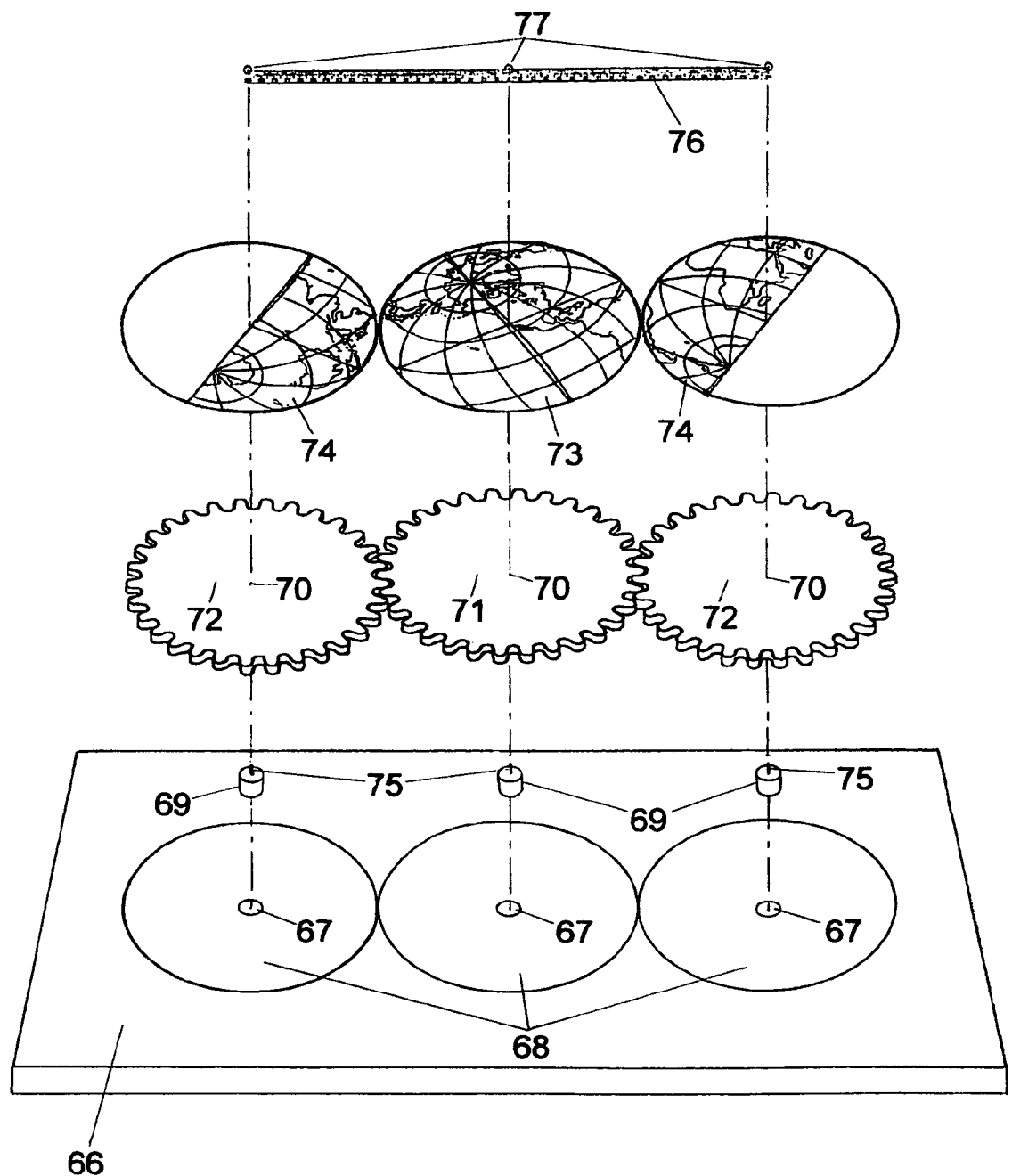
FIG. 6 is an illustration of a device based on FIG. 5.

We can attach gears and a ruler to the maps of FIG. 5. The pair of semi-hemispheres can move along the circumference of the main body synchronously so to show great circles of the whole world. Mechanically speaking, this pair of semi-hemispheres and the hemisphere of the main body should stay fixed. FIG. 6 shows such a case.

A piece of board 66, such as cardboard or plastic board, has three holes 67 in the center of three circles 68. Three small shafts 69 are connected firmly to backsides of each axis 70 of gears 71 and 72 and the shafts are inserted into three respective holes 67. These gear axes are aligned with each other along the east-west line. On middle gear 71, a map of hemisphere 73 for the main body is adhered and a pair of maps of semi-hemispheres 74 is adhered on respective outer gears 72. However, these maps may be convertible to other hemispheric maps instead of adhered firmly. Thus, we can prepare sets of maps that many different cities are their center points.

By turning the main hemisphere right or left, the pair of the semi-hemispheres also turn left or right accordingly.

The heads of shafts 69 are shaped like pins 75 that pierce the gears and the maps of the hemisphere and semi-hemispheres. A ruler 76 has a "0" in the center and 20 units each to the right and left. It also has three tiny holes 77 for receiving the three pins. When the ruler is positioned on the pins, it indicates a location of a great circle at any angle.

The maps of semi-hemispheres 74 can be divided more than two in the same way in FIG. 4. However, since we need a full round gear for each section of the maps, more than four divisions may not be practical for the limited space around the main body.

With these nets of latitude and longitude, the map gives us a 3-D impression and with the intermeshed gears we can turn it around unlike regular world maps printed on paper. This device is the best approximation of a globe. So I call this map a "Flat Globe".

We can also draw a compass rose (a circular design on maps indicating the compass points but not shown here) or a similar protractor-like marking around a center point of a map, preferably in a light color.

If we have the map of FIG. 6 with the gears, the ruler, and the compass rose, we can determine the direction of a long-range missile quickly and precisely. If the center point of this map is made the prospective launching site, I believe that it will be very useful for defense strategy. This map may also be a useful tool for people who use compass bearings for divination. Conversely, by making a map of this kind with Mecca is its center point, Moslems abroad can easily find the direction they should face when praying.

CONCLUSION, RAMIFICATION, AND SCOPE

I believe that the present AE Hemispheric projection is the simplest one ever made. Reflecting the Earth's roundness, the main part of the Earth is shown as round. The back landscapes of the Earth, cut half or more and opened ajar like a painting on a folding screen, are situated at sides. Any city or location in the world can be highlighted at the center point of the front stage. Thus, I call this projection a "My Town is the World's Center Projection" or simply "Shinozuka Projection" according to the custom in cartography. Many projections are named after the inventor, such as Mercator, Robinson, Goode, Bonne, Peter, Hammer, Miller, and Lambert.

Since a hemisphere of a main body in my projection is exactly the same as an inner half of a circle in ordinary AE projection, most advantages of the both projections are equally present in either. However, the grotesque shapes of outer landmasses in the latter projection make detailed physical or political world maps valueless. Unsightly stretched parts of the outer topographical figures bring the preciseness of the inner half to naught and determine the impression of the whole. In my projection, on the contrary to it, all the shapes of the continents, though interrupted at the borders of circles, are realistic and recognizable. We can draw mountain ranges and lower lands in different colors vividly and in detail, all the way to the farthest borders of the world map.

Furthermore, I have learned the importance of an antipodal point in relation to a great circle. A great circle line passing a center point in a given hemisphere never fails to pass an antipodal point of an anti-hemisphere. In fact, I had to use it to determine where a tangent point should be when I drew my figures. But in other projections, an antipodal point is neither explicit nor important at all.

For reasons discussed above and in the detailed description section, my projection is unique and different from the ordinary AE projection, notwithstanding the similarity in appearance. Namely, while in the latter projection, topographical figures of the anti-hemisphere are transformed and stretched in the area of the large ring, in my AE Hemispheric projection they are not transformed but remain to occupy the same shape and amount of area as the main hemisphere. This preservation of the anti-hemispheric figures provides almost all the advantages of the ordinary AE projection, plus additional advantages. That is 1. We can show the shortest air routes and correct direction from a center point of interest to any other points on Earth with realistic and recognizable shapes even for remote continents.
2. We can show an antipodal point clearly as a point.
3. We can show the main hemisphere in the same size and shape of roundness as a globe, which is a reminder of the real Earth.
4. We can show a great circle by a straight line.
5. We can show any location as a center point of interest and treat it as such, unlike other ordinary hemispheric world maps.

Although the above description contains many specificities, these should not be construed as limiting the scope, but merely as providing illustrations of some of the presently preferred embodiments. Many variations and ramifications are possible.

I believe my projection has a broad range of use. Not only can it be used for airline route maps and others, but also I foresee that my projection will be useable in every science museum and geography classroom.

This projection is also useful for drawing maps of other spherical bodies, such as Mars and the Moon. As mentioned, we cannot see all parts of a globe in one view and figures in the outer areas of a front and main hemisphere are shrunk or invisible. The same argument applies to other planets and moons. A picture taken from a spacecraft is not necessary a good representation of a planetary body as a map. A map drawn in my projection may be more realistic and have broader usage than such a picture. For instance, using a map in the AE Hemispheric projection, we may be able to measure a correct tracking distance that a Mars rover makes.

By using computer software animation maps, we can see how earthquakes and tsunamis propagate in action. Such programs would help save many people's lives. As time elapses, wave patterns would spread to border of a hemisphere and then converge to an antipodal point in anti-hemisphere, reflecting the real Earth.

Tracking routes of satellite path are usually drawn by curving lines on an ordinary Mercator map or others. However, the satellite should not be maneuvered like an automobile except for occasional minor adjustments, but fly along a certain orbit over a great circle. The rotation of the Earth makes every turn of the satellite different from the one before. Computer animation will allow us to have a map that moves its center point continuously according to the Earth's rotation. With such kind of moving map in my projection, the satellite path always remains straight, reflecting the reality.

Another use is in the field of computer animation to provide a transition between a virtual Earth and regional maps. The computer may show a rotating Earth that stops at a certain spot to feature a center point of interest, whereupon it turns into a map of hemisphere in AE and then two halves of its anti-hemisphere spread out from the backside like folded panels of a satellite. This animated transition will supplement the drawbacks of a virtual Earth or a globe and help people understand the relationship between a place of interest and other places in the world in one view.

A computer may also be used to implement the gears and pivot points of the various embodiments.

As mentioned in the prior-art section, there is no flat world map that is movable like a virtual Earth, to my knowledge. But as I discussed above, the moving flat map is desirable or necessary for such case as depicting the satellite path on top of considering the Earth's rotation. My projection may be the only projection that is possible to change its center point of a map constantly without influencing the shapes and sizes of the continents much. Thus, the AE Hemispheric projection is very compatible with computer animation, i.e., it is the most suitable and widely applicable projection for a computer.

There have been hemispheric world maps where two hemispheres are placed side by side or fused partially into one, but, insofar as I am aware, none with semi-hemispheres. The embodiment, "World Map Over Continental Hemisphere" in FIG. 2 of my related patent, supra, shows semi-hemispheres, but that figure has only interrupted shapes of the continents fused so to have no break. The preferred embodiment, "Map (profile) of the Earth's Continent" in FIG. 1 of this patent, which derived from the above embodiment, does not have any break at all in any landmasses. Those two former embodiments have the merit of no break in the continental shapes, which the embodiments in this application do not have. Therefore, the embodiments in both my present and former applications supplement each other and can be used in tandem.

For example, various interrupted maps deriving from the embodiments in this application may accompany the above-mentioned map of the continents as an index map and as a representation of the complete figure of the continents. A dot mark in outstanding color on the latter map designates the center point of the former map. (If the dot mark should fall on an ocean area, e.g. for a case of an epicenter, the map over the continental hemisphere may be preferable to the map of the continents.) The map of the continents is the only well-balanced world map showing that all the continents are unified as one giant organization. After all, there is no other world map that is superior to it and can replace it, to supplement the interrupted maps.

Accordingly the scope should be determined, not by the embodiments illustrated, but by the appended claims and their legal equivalents.

I claim:

1. A map of a predetermined area of an actual three-dimensional generally spherical geographical surface, said map being arranged in an Azimuthal Equidistant Hemispheric projection and comprising:
    a depiction of one hemisphere of said geographical surface, the center of said hemisphere being a predetermined point on said geographical surface, and
    a depiction of the opposing hemisphere of said geographical surface, said opposing hemisphere comprising two or more separate parts,
    said two or more separate parts of said opposing hemisphere positioned adjacent separate portions on the border of said depiction of one hemisphere so as to form two or more separate junctions, or two or more tangent points, between said one hemisphere and each of said parts of said opposing hemisphere,
    said two or more separate parts of said opposing hemisphere being positioned so that the geographical areas depicted adjacent each side of each junction represent adjacent parts of said actual geographical surface,
    whereby a map of said predetermined area in an Azimuthal Equidistant projection with reduced distortion will be produced so that said predetermined area can be seen whole at one look and so that a point of interest in predetermined area can be placed at the center of said map.

2. The map of claim 1, further including means for moving said two or more separate parts of said opposing hemisphere around the border of said depiction of one hemisphere in such a coordinated manner that said two or more separate parts of said opposing hemisphere will always be positioned so that the geographical areas depicted adjacent each side of each junction represent adjacent parts of said actual geographical surface.

3. The map of claim 2 wherein said means for moving comprises a set of intermeshed gears.

4. A flat depiction of a world map comprising:
    a depiction of one hemisphere, the center of said hemisphere being a predetermined point, and
    a pair of divided parts of a depiction of an opposing hemisphere, said opposing hemisphere being divided at a meridian through an antipodal point of said opposing hemisphere,
    each divided part of said opposing hemisphere being positioned adjacent a circumference of said one hemisphere on opposite sides thereof so as to align with said predetermined point in said one hemisphere in an east-west direction,
    means for enabling said pair of said divided parts to move along said circumference of said one hemisphere synchronously so to show great circles of the whole world.

5. The world map of claim 4 wherein said means for enabling comprises:
    a board having three or more holes
    three or more gears and three or more shafts attached to the axes of said gears,
    said three gears comprising a pair of outer gears and a middle gear positioned between said outer gears,
    said shafts being inserted into said three respective holes, so that said gears with said shafts can rotate around their axes,
    said axes being aligned with each other along a predetermined straight line on said world map,
    said middle gear containing a depiction of said one hemisphere of said world map and said pair of outer gears containing a depiction of said divided parts of said opposing hemisphere,
    whereby said depictions on said gears can be used to show the correct distance and direction from any point on said world map to any other point on said world map by a straight line.

6. The flat depiction of claim 5 wherein each of said pair of outer gears shows a plurality of separate parts of said divided parts of a depiction of said opposing hemisphere, and is positioned on opposite sides of said middle gears.

7. The flat depiction of claim 5 wherein said middle gear is arranged so that it can be turned clockwise or counterclockwise and said outer gears are arranged to respond so that they will turn counterclockwise or clockwise respectively, so that correct direction and distance from said predetermined point to any other point in the world can be obtained easily and quickly.

* * * * *